United States Patent
Reinmoeller et al.

(10) Patent No.: US 8,684,790 B2
(45) Date of Patent: Apr. 1, 2014

(54) METHOD AND ARRANGEMENT FOR MAINTENANCE OF GAS-TURBINE BLADES

(75) Inventors: Ulf Reinmoeller, Hamburg (DE); Matthias Panten, Kaltenkirchen (DE); Ernst Kerschbaumer, Oersdorf (AT)

(73) Assignee: Lufthansa Technik AG, Hamburg (DE)

( * ) Notice: Subject to any disclaimer, the term of this patent is extended or adjusted under 35 U.S.C. 154(b) by 1116 days.

(21) Appl. No.: 12/668,833

(22) PCT Filed: Jul. 10, 2008

(86) PCT No.: PCT/EP2008/005648
§ 371 (c)(1), (2), (4) Date: Jan. 12, 2010

(87) PCT Pub. No.: WO2009/007121
PCT Pub. Date: Jan. 15, 2009

(65) Prior Publication Data
US 2010/0261411 A1    Oct. 14, 2010

(30) Foreign Application Priority Data

Jul. 12, 2007   (EP) ................................. 07013719

(51) Int. Cl.
*B24B 49/00*    (2012.01)
(52) U.S. Cl.
USPC .................................. 451/5; 451/8; 451/11
(58) Field of Classification Search
USPC .................................................. 451/5, 8, 11
See application file for complete search history.

(56) References Cited

U.S. PATENT DOCUMENTS

| | | | | |
|---|---|---|---|---|
| 3,925,878 A | * | 12/1975 | Kikuchi | 483/33 |
| 4,692,983 A | * | 9/1987 | Kristola et al. | 29/432 |
| 4,835,710 A | * | 5/1989 | Schnelle et al. | 700/262 |
| 4,972,347 A | * | 11/1990 | Tarvin et al. | 700/186 |
| 5,193,314 A | | 3/1993 | Wormley et al. | |
| 7,097,540 B1 | * | 8/2006 | Gosinski et al. | 451/8 |
| 7,303,461 B1 | * | 12/2007 | Campomanes et al. | 451/28 |
| 2002/0119730 A1 | | 8/2002 | Dean et al. | |

FOREIGN PATENT DOCUMENTS

| | | | | |
|---|---|---|---|---|
| DE | 3532667 | | 3/1987 | |
| EP | 0483064 | | 4/1992 | |
| EP | 1316389 | | 6/2003 | |
| GB | 2227435 | | 8/1990 | |
| JP | 2002301659 | | 10/2002 | |
| JP | 2002301659 A | * | 10/2002 | ............. B24B 49/02 |

* cited by examiner

*Primary Examiner* — Maurina Rachuba
(74) *Attorney, Agent, or Firm* — Casimir Jones, S.C.

(57) ABSTRACT

The invention relates to a method and an arrangement for re-creation of an optimized contour of the leading edges of gas-turbine blades, in which a gas-turbine blade (2) is passed by one or more grinding machine or machines (71, 71') with the aid of a computer-controlled robot (10). The desired contour is achieved by following a movement procedure which is stored in a data memory (21). The stored movement procedure is designed to convert a blade from a previously determined statistical mean wear state to a likewise previously determined or calculated design contour. The contact pressure of the gas-turbine blade on the grinding disk or disks (71, 71') is measured and is taken into account in the movement procedure of the robot (10) such that the desired design contour is achieved irrespective of the initial contour and wear of the grinding disks.

20 Claims, 3 Drawing Sheets

METHOD AND ARRANGEMENT FOR MAINTENANCE OF GAS-TURBINE BLADES

The present application is a §371 National Phase application of International Application No. PCT/EP08/005,648, filed Jul. 10, 2008, which claims priority to European Patent Application Ser. No. 07013719.5, filed Jul. 12, 2007, each of which is incorporated herein by reference in its entirety.

The invention refers to a method and an arrangement by means of which the contours of the leading edges of used gas turbine blades can be machined.

In gas turbines, blades are used both in the compressor stage and in the turbine stage. These blades as a rule have an airfoil profile. In order to achieve an efficiency which is as high as possible this profile is optimized for the blades of each individual turbine stage. Part of this optimization is also the profiling of the leading edge.

In the field of gas turbines, the high-pressure compressor section plays a highly significant role since it has a large influence upon the output of the entire system. The compressor blades which are used there are deformed, however, in the course of time as a result of aerodynamic load and various other influences. In the case of aircraft power plants, which constitute a special form of gas turbine, these other influences for example may consist of ingested dust, hail or other solid projectiles.

As a result of deviations from the ideal shape of the blades efficiency losses of the power plant occur. On the other hand, the individual blades are too cost-intensive in their production so that a regular exchange of damaged blades by new parts does not seem to be practical. It is therefore a requirement to repair damaged blades cost-effectively so that the efficiency of the power plant is increased again.

As a result of public prior use, a method is known in which the leading edges of damaged blades are manually reground. The aim of this machining is the compensating of unevennesses. For this, each blade must be fed individually by a mechanic to a grinding machine. With this method, however, as a rule only the leading edge is able to be smoothed, without giving it an optimized shape, because although the profile of the reground blade no longer corresponds to that of a new part there are more favorable or less favorable cross sections in the region of the leading edge of power plant blades which have direct effects upon the efficiency of the entire power plant.

In the prior art (JP-A-2002301659), it is furthermore known to have individual working steps carried out by robots during the mechanical machining of components. Robots offer the advantage that deviations from the desired result as a rule occur less than in the case of manual machining. Since robots constantly follow a predetermined movement sequence, they are suitable, however, only for the machining of components which from the beginning lie within a relatively close tolerance spectrum. In the case of gas turbine blades, this as a rule is given only in the case of new parts.

The invention is based on the object of improving the repair of used power plant blades to the effect that by means of an automated machining of the blades an optimized contour is repeatedly achieved.

The solution according to the invention lies in the method and also in the arrangement according to the independent claims. Advantageous developments result from the dependent claims.

In the case of the method according to the invention for reproducing an optimized contour of the leading edges of gas turbine blades, a gas turbine blade, by means of a computer-controlled robot, is guided past one or more grinding machines so that as a result of following a movement sequence which is stored in a data memory the desired contour is achieved, wherein the contact pressure of the compressor blade on the grinding disk(s) is measured and taken into consideration in the movement sequence of the robot so that the desired contour is achieved regardless of the initial contour and wear of the grinding disks. The stored movement sequence is designed for converting a blade from a predetermined static average wear state into an also predetermined or precalculated design contour.

The arrangement according to the invention for reproducing an optimized contour of the leading edges of gas turbine blades comprises a computer-controlled robot for the guiding of an individual gas turbine blade, at least one grinding machine in the movement radius of the robot for the metal-removing machining of this gas turbine blade, and also a computer unit for controlling the robot, which comprises a data memory in which the movement sequence of the robot is stored, wherein the at least one grinding machine has a sensor for the contact pressure of the workpiece and its measured signal output is connected to the computer unit. The stored movement sequence is designed for converting a blade from a predetermined static average wear state into an also predetermined or precalculated design contour.

The arrangement according to the invention has a grinding machine, which is suitable for carrying out the method according to the invention, for metal-removing machining of a workpiece which is applied with contact force at the working point. The grinding machine comprises a rotating grinding disk which is driven by a motor. The grinding disk can be displaceably mounted on a path in the contact direction and can have a device for creating a defined contact pressure.

First of all, some of the terms which are used within the scope of the invention should be explained:

The term gas turbine blade is generic and includes both the blades of the compressor stages and those of the turbine stages.

The different configuration of blades of the individual compressor stages and turbine stages of a gas turbine is covered by blade type. Also, blades of the same stages of different power plants as a rule are of a different blade type.

The radius of action of a robot refers to the range in which the robot can act. In the case of a stationary robot, this range is determined by the maximum reach of the extension arm.

The robot is capable of guiding individual gas turbine blades past measuring and cutting machines. The robot is preferably computer-controlled for this and has the necessary degrees of freedom for the machining. This for example can be ensured by the use of a commercially available 6-axis robot. The movement sequence of the robot is stored in a data memory. Provision is preferably to be made in this data memory for a multiplicity of movement sequences to be stored, which can be retrieved depending upon the blade type which is to be machined. Furthermore, it is preferred if the robot is equipped with a gripper arm which is matched to the blade type which is to be machined and which enables gas turbine blades to be automatically picked up and placed down. When machining different blade types with the same arrangement, it can be advantageous if the robot can automatically exchange the gripper arm in order to ensure an optimum gripping of each blade type. For this, a magazine is preferably provided, in which the gripper arms for the robot are accessibly stored.

At least one grinding machine is arranged in the radius of action of the robot. This is characterized in that it measures the contact pressure of a workpiece on the grinding disk. This measured value can be transmitted to the computer which controls the robot and taken into consideration in the movement sequence of the robot. Consequently, the result of the machining process is no longer exclusively dependent upon the geometry of the gas turbine blade in the initial state. Deviations in the geometry can be taken into consideration rather by comparison of the measured contact pressure with an ideal value.

The optimized contour, which is produced or reproduced in the method according to the invention, of the gas turbine blade (also called design contour) is empirically and/or mathematically developed or calculated. According to the invention, provision is made for a typical wear state of a turbine blade type to be determined, preferably by forming the statistical average of the actual state from a multiplicity of blades, preferably from about 100 to 500 blades, of a specific type. Furthermore, tolerance ranges around this statistical average wear state are preferably defined, within which a gas turbine blade can be reconditioned according to the invention. As explained further below, blades which lie outside this tolerance range, or those blades with which is associated a machining program which does not coincide with the selected program, can be detected and rejected by suitable measuring (for example signal strength of a magnetic sensor) before the machining process.

The parameterization of the grinding machine is carried out in such a way that the machining process converts a blade from the predetermined statistical average wear state into the also predetermined or precalculated design contour. The measuring which is provided according to the invention of the contact pressure of the blade which is to be machined on the tool (preferably the grinding disk) of the grinding machine allows each individual gas turbine blade with an individual wear contour, which admittedly deviates from the average statistical wear state but still lies within the tolerance range, to therefore be converted completely or to a large extent into the predetermined design contour, preferably by means of allowance in the movement sequence of the robot and/or by means of a displaceable mounting of the grinding disk. As a result, the necessity of measuring in detail each individual gas turbine blade before the machining process is dispensed with.

The invention therefore enables an automated, simple and quick dressing of gas turbine blades, during which each individual blade, before the actual grinding process, only has to be checked for whether it falls within the prespecified tolerance range or for whether the correct machining program was selected for the blade type in question. According to the invention, the exact actual state of each individual blade within the tolerance range has neither to be determined nor taken into consideration during the pre-programming or parameterization of the grinding process.

At least two grinding machines, which are preferably fitted with grinding disks of different consistency and/or size, are preferably located in the radius of action of the robot in order to thus achieve an improved end result of the overall machining step and/or time saving. Consequently, the machining time of blades, which on account of their profiling require machining with grinding disks of different radii or widths, can be reduced since a time-consuming exchange of grinding disks, as in the case of only one grinding machine, is not called for. The compressor blade of the first stage of power plant type CFM56 for example requires machining with a small grinding disk on account of its profiling in the tip region, whereas the remaining regions can be machined with a large grinding disk. If different blade types require grinding disks consisting of different base materials (for example alloys of titanium or steel) and/or of different size or width, a change of grinding disks can also be dispensed with. Therefore, different blade types can be machined without a time-consuming change of grinding disks having to take place. Furthermore, it is preferred that the robot can automatically exchange the grinding disks on the grinding machines. For this, provision is to be made for a corresponding robot tool which can preferably be changed like the gripper arms. The tool is preferably a magazine which can be reached by the robot, with which are to be provided grinding disks which are required for the machining of different blade types.

Also, if the arrangement according to the invention allows deviations from an idealized initial shape of the used gas turbine blades, then some blades are degraded to such a degree that a repair by exclusively metal-removing machining is no longer a possibility. In order to reject these before commencement of the actual machining process, the individual gas turbine blades are preferably guided past a measuring device which measures at least one characteristic variable of the component.

This characteristic variable for example can be the chord length of the airfoil profile. If the measured variable of a gas turbine blade falls below a determined limiting value, then this blade is preferably rejected before commencement of the metal-removing machining.

In order to be able to reject blades which are not of the type which is taken as the basis for the statistical average wear state before the machining process, provision can be made for a magnetic sensor. After gripping the gas turbine blade from the box, the robot then guides this, with a blade type-dependent clearance, past the magnetic sensor. In so doing, the gas turbine blade is guided past the sensor parallel to its profile, by which the length of the gas turbine blade can be detected. Via the return signal of the magnetic sensor (for example with reference to the signal strength), it can be determined whether a gas turbine blade of the prespecified type or of another type was gripped. The sensor does not return a signal if no turbine blade, or only a small turbine blade, was gripped or the length of a gripped gas turbine blade exceeds the aforementioned clearance and so does not at all reach the measuring field of the magnetic sensor.

In order to minimize as far as possible the deviations when machining the gas turbine blades, the axes of the robots are preferably arranged so that the non-cutting time elements are as small as possible during movements perpendicular to the grinding disk. As a result, the effect is achieved of the distance from the middle point of the grinding disk to the workpiece being able to be accurately adjusted.

In order to ensure a continuous operation of the arrangement, provision can be made for a device which introduces gas turbine blades which are still to be machined into the radius of action of the robot and transports out of this blades which have already been machined. A multiplicity of gas turbine blades can preferably be gathered together in boxes for this, which makes logistics easier. By means of such a device a fully automatic 24/7 operation is possible.

The claimed method basically comprises the preferred handling sequence for the operation of the described arrangement.

Furthermore, damage to the gas turbine blade, which prohibits a repair by means of the arrangement according to the invention, can also still be determined during the grinding process. If the measured contact pressure exceeds tolerances which are determined and stored in the data memory, then it can be concluded from this that the workpiece deviates too much from the ideal initial geometry. The gas turbine blade which is in progress can subsequently be rejected. By means of the measured contact pressure, a malfunction of the robot can also be determined. If for example a robot axis overload occurs, i.e. the robot presses the gas turbine blade which is in progress too hard against the grinding disk, the entire process can be interrupted. As a result of such an emergency stop, extensive damage to the gas turbine blade and/or to parts of the arrangement according to the invention, or to parts of the arrangement which are required for carrying out the method according to the invention, can be avoided.

The claimed arrangement can comprise a particularly suitable grinding machine.

The grinding machine comprises a motor which drives an exchangeable grinding disk, by means of which material is removed from a workpiece which abuts with contact pressure against the working point. The grinding disk, preferably together with its drive motor, is displaceably mounted. In this case, the path of displacement is designed so that the disk can move away from the working point. The grinding disk is therefore mounted so that the contact pressure can be accurately adjusted by means of displacement itself. In order to achieve this, provision is made for a drive device which can move the grinding disk along the described path and therefore makes the contact pressure adjustable.

The path on which the grinding disk is moved is preferably arranged exclusively perpendicularly to its rotational axis. Consequently, transverse displacements of the grinding disk in relation to the workpiece are prevented. The shapes of the paths in the first instance are optional, but are preferably rectilinear or circular shapes.

A pendulum suspension of drive motor and grinding disk has proved to be a particularly favorable possibility of achieving a circular path of the grinding disk. In this case, the two components are suspended on a single axis above their own position around which they can freely oscillate.

In order to be able to detect the contact pressure, provision is made for a corresponding sensor. This is to be attached so that it delivers constantly accurate values regardless of the position of the grinding disk on the displacement path.

For creating the actual contact pressure, provision can be made for utilizing gravity. In the case of the pendulum suspension, this is achieved if the pendulum is correspondingly deflected during the machining. For the necessary weight for creating a sufficiently large contact pressure, provision can be made for additional weights in addition to the natural weight of the drive motor and/or of the grinding disk. In the case of other path shapes, an additional weight, via corresponding deflection, can apply the necessary force for creating the contact pressure. It is preferred, however, if the contact pressure is created by means of a—for example electric—drive unit. As a result, the created pressure can be adjusted at the same time.

In order to protect the workpiece against damage in the case of failure of the drive unit which is provided for creating the contact pressure, provision can be made for the grinding disk to be moved away from the workpiece in such a case, for example on account of gravity.

The described pendulum suspension of the grinding disk for example is capable of converting the leading edge of a gas turbine blade into the desired design contour even when this leading edge has deviations of about 2 to 3 mm relative to the statistical average wear state or for example when as a result of inaccuracies when gripping the blade by the robot there are angle deviations of up to 4° with regard to the angular position at which this leading edge is fed to the grinding tool relative to the statistical determined average angular position.

The invention is subsequently explained with reference to the attached drawings in which in each case an advantageous exemplary embodiment of the arrangement and also device according to the invention is shown. In the drawing.

Figure 1:
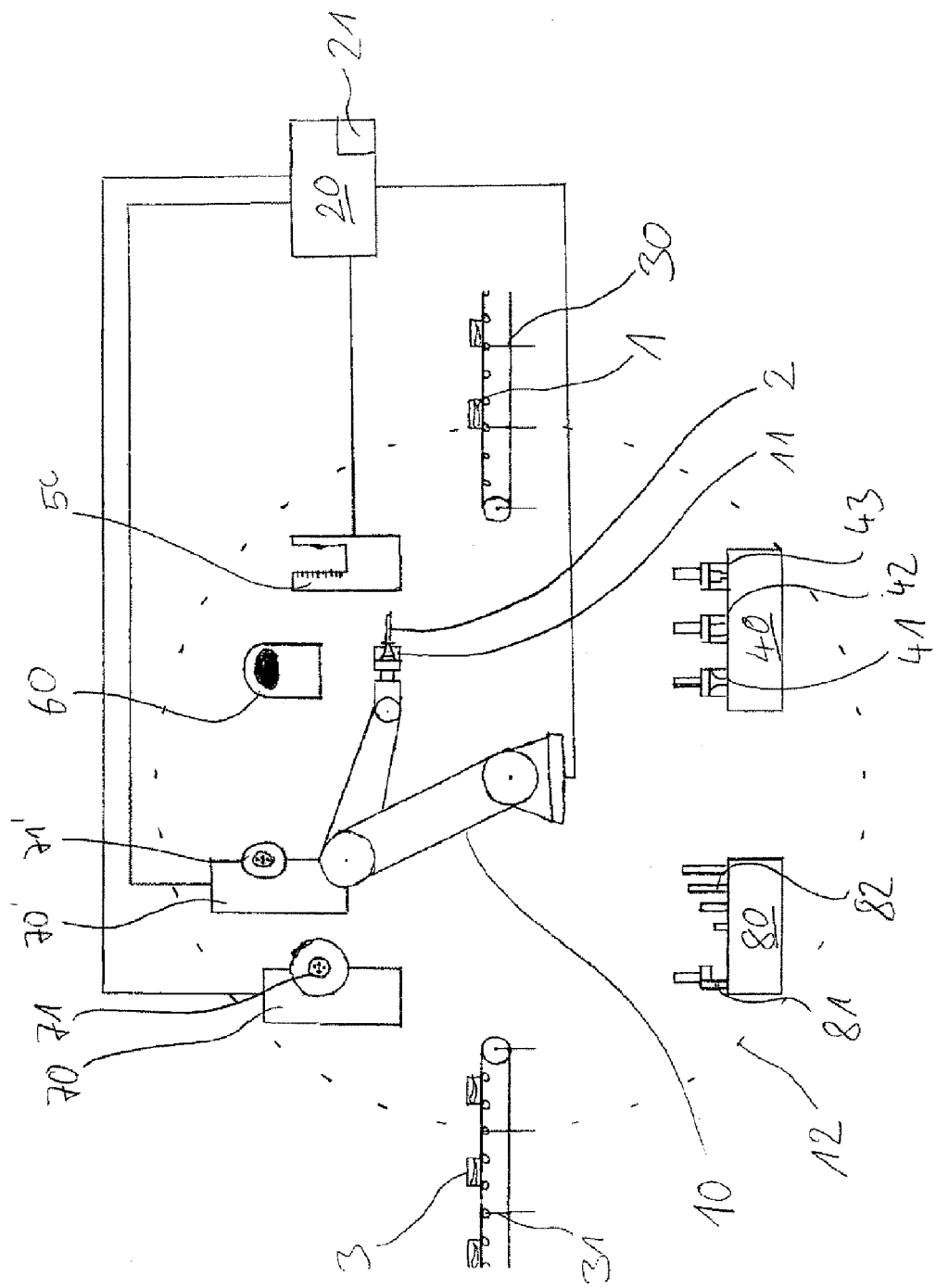
FIG. 1 shows a functional representation of the exemplary arrangement.

FIG. 1 shows a 6-axis robot 10, on the movable end of which a gripper arm 11 is attached. The maximum reach of the robot 10 forms the radius of action 12. The robot 10 is controlled by the computer unit 20 with data memory 21.

Via the conveyor belt 30, unmachined used gas turbine blades 1 are transported into the radius of action 12 of the robot 10. With its gripper arm 11, the robot 10 can grip one of these gas turbine blades 2 in each case.

So that the robot 10 can reliably guide the gas turbine blades 2, a magazine 40 with different gripper arms 41, 42, 43 is made available to the robot 10 within the radius of action 12, from which the robot 10 itself can be operated so that a gripper arm 11 which is suitable for the blade 2 which is to be machined is always located on the robot 10.

In the exemplary embodiment which is shown, the sequence of blade types of the unmachined gas turbine blades 1 is stored in the data memory 21 of the computer unit 20. For this, it is necessary for the sequence to be inputted into the data memory 21. This can take place manually. It is also possible, however, for the type of gas turbine blades 1 to be determined by means of sensors and transmitted to the computer unit 20. In the case of this alternative, the manual input is completely dispensed with. It is also possible to gather together a plurality of gas turbine blades 1 in a box, wherein only blades of the same type or blades in a fixed arrangement pattern are always located in one box. As a result, the input effort can be significantly reduced since information only has to be inputted per box and no longer per blade.

After the robot 10 has securely gripped a blade 2 which is to be machined, it guides it past a measuring device 50 which is located in the radius of action 12. With this measuring device 50, at least one characteristic variable of the blade 2 is measured. In the case of this characteristic variable it can be for example the chord length of the airfoil profile of the blade 2. The measured value is then compared in the computer unit 20 with a minimum and/or maximum nominal value. Should a deviation which is too great be determined, the blade 2 is rejected before commencement of the machining process and thrown into the container 60. For example, by manual building-up by welding of material, the blades which land in the container 60 can be restored, albeit partially, to the extent that after passing through the arrangement again they can be reused in a gas turbine.

The measuring device can also be designed for being able to determine, before commencement of the machining, whether the gripped blade 2 features the type which is taken as the basis for the statistical average wear state. For this purpose, provision can be made in the measuring device 50 for a magnetic sensor 51 (not shown in FIG. 1). The principle of operation of the magnetic sensor 51 is described in more detail further below with reference to FIG. 3.

If the blade 2 is within the tolerance range of measurement on the measuring device 50 and/or features the type which is taken as the basis for the statistical average wear state, it is fed to a grinding machine 70 or 70'. The use of two grinding machines 70, 70' offers the advantage that two grinding disks 71, 71' with different coarseness and/or diameter are always made available for the machining of the blade 2 without a time-consuming change of grinding disks. Consequently, the machining result can be further improved. Only one grinding disk, or more than the two grinding disks 70, 70' which are shown, can also be selectively used however.

Depending upon the blade type of the blade 2 which is to be machined, the grinding disks 71, 71' can be changed by means of the robot 10. For this, a corresponding robot tool 81 and also a multiplicity of grinding disks 82 are made available in a magazine 80.

The grinding machines 70, 70' are characterized by a sensor for the contact pressure of the blade 2 on the grinding disks 71, 71'. The measured signals of these sensors are transmitted to the computer unit 20 and so can be taken into consideration in the movement sequence of the robot 10. As a result, it is possible to still also machine blades 2 which deviate from an ideal shape. The result of the machining process is therefore no longer only dependent upon the geometry of the gas turbine blade 2 in the initial state.

Should it be proved during machining on the grinding machines 70, 70' that the blade 2 deviates too much from an ideal shape, then it lands in the container 60. The same applies to such gas turbine blades for which it was determined by a sensor that they did not feature the type which is taken as the basis for the statistical average wear state.

After subsequent and successful machining of the blade 2, this is placed next to other, already machined blades 3 on a conveyor belt 31 which brings the blades 3 out of the radius of action 12 of the robot 10. In this case, the belt for transporting away 31 must not be constructed separately from that for the delivery 30. It is also possible to use a common conveyor belt. When using boxes, provision can furthermore be made for machined blades 3 to be sorted into the box again in their original position.

Figure 2:
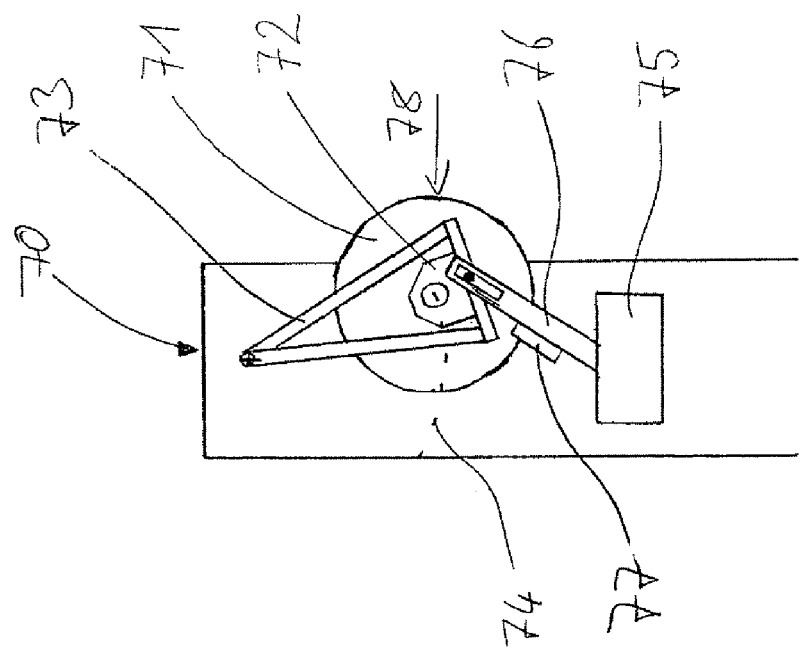
FIG. 2 shows an exemplary embodiment of a grinding machine according to the invention.

In FIG. 2, an exemplary embodiment of a grinding machine according to the invention is shown. The grinding machine 70 comprises a grinding disk 71 which is driven by means of a motor 72. Motor 72 and grinding disk 71 are arranged on a pendulum 73. The pendulum 73 is rotatably mounted above the motor 72. Motor 72 and grinding disk 71 can therefore move on a circular path 74.

In order to accurately adjust the position of the grinding disk 71 on the circular path 74, provision is made for a drive unit 75 which is connected to the pendulum 73 via an extension arm 76. A tension measuring gauge 77, by means of which it is possible to determine the contact pressure, which is indicated by means of the arrow 78, of a workpiece (not shown) on the grinding disk 71, is located on this extension arm 76. As a result of the contact pressure 78, a bending stress specifically ensues in the extension arm 76. Naturally, optional other measuring methods are also possible, however. It is also conceivable to design the drive of the pendulum differently.

In the illustration, the pendulum 73 is located in the grinding position, i.e. in this position the workpiece is fed to the grinding disk 71 and the drive unit 75 creates force sufficiently to hold the pendulum 73 in this position despite contact pressure 78. The pendulum is therefore not located in the neutral position during the grinding process.

In the event that the drive unit 75 fails, or the contact pressure cannot be maintained on account of another defect, the grinding disk 71 is automatically moved away from the workpiece. This takes place on account of gravity which returns the pendulum 73 together with motor and grinding disk 71 into the neutral position. Damage to the workpiece is avoided in this way.

Figure 3:
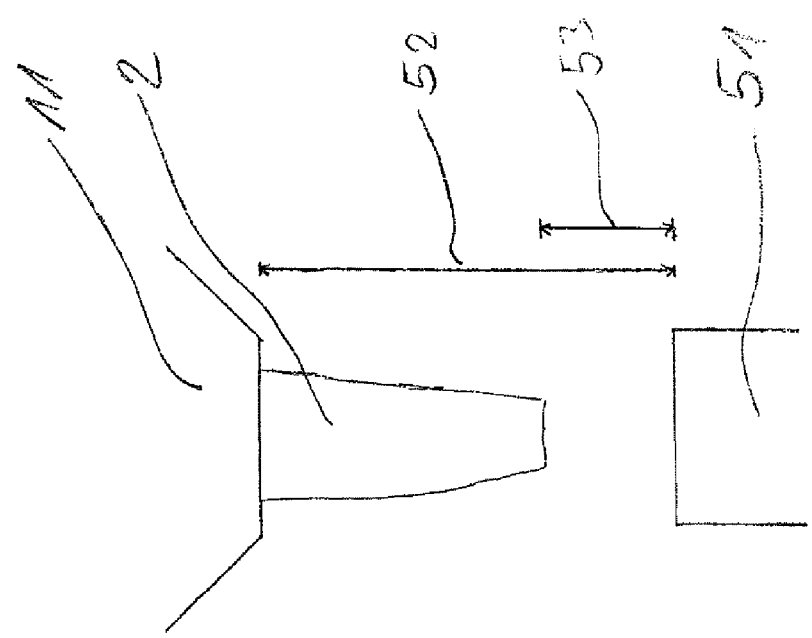
FIG. 3 shows a schematic representation of the principle of operation of a magnetic sensor for determining the blade type.

With reference to the schematic representation in FIG. 3, the principle of operation of a magnetic sensor 51 for checking the type of a blade 2 which is held by means of the gripper arm 11 is now described. The blade 2 is guided past the magnetic sensor 51 by means of the robot (not shown here), in fact preferably in a plane parallel to the profile of the blade 2. The clearance 52 between the magnetic sensor 51 and the gripper arm 11 in this case is selected in dependence upon the expected blade type so that for a blade of the expected blade type a defined clearance 53 between the tip of the blade 2 and the magnetic sensor 51 ensues.

The magnetic sensor 51 sends out a signal in dependence upon the clearance 53, which can be processed by the computer unit 20 (not shown here). If the clearance 53 is not maintained, the blade 2 which is located in the gripper arm 11 is not identified as a blade 2 of the type which is taken as the basis for the statistical average wear state, and the blade is rejected.

If the clearance 53 is too large in the case of a blade 2, or a blade 2 is not located in the gripper arm 11, the sensor 51 does not deliver a signal. The process is then also interrupted. If the blade 2 is longer than the clearance 52, it cannot be guided past the sensor 51. In this case also, the process can be interrupted and the blade is rejected.

The invention claimed is:

1. A method for reproducing an optimized contour of the leading edges of gas turbine blades, in which a gas turbine blade (2), by means of a computer-controlled robot (10), is guided past at least one grinding machine (70, 70') so that as a result of following a movement sequence which is stored in a data memory (21) the desired contour is achieved, wherein the stored movement sequence is designed for converting a blade from a predetermined statistical average wear state into an also previously determined or calculated design contour; and in that the contact pressure of the gas turbine blade on a grinding disk (71, 71') is measured and taken into consideration in the movement sequence of the robot (10) so that the desired design contour is achieved regardless of the initial contour and wear of the grinding disks.

2. The method as claimed in claim 1, wherein the robot (10) is equipped with a suitable gripper arm (11), depending upon the blade type which is to be machined.

3. The method as claimed in claim 1, wherein the at least one grinding machine (70, 70') is fitted with a suitable grinding disk (71, 71'), depending upon the blade type which is to be machined.

4. The method as claimed in claim 1, wherein before commencement of the machining process, the presence and at least one characteristic variable of the gas turbine blade (2) which is to be machined are checked.

5. The method as claimed in claim 4, wherein gas turbine blades (2) which do not maintain a limiting value for the measured characteristic variable are rejected before the machining.

6. The method as claimed in claim 1, wherein gas turbine blades (2) in the case of which the contact pressure of the grinding disk, (71, 71') which is measured during the machining, lies outside a determined tolerance on account of shape deviations of the gas turbine blade, are automatically rejected.

7. The method as claimed in claim 1, wherein movement sequences for a multiplicity of different blade types are stored in the data memory (21) and can be retrieved when required.

8. An arrangement for carrying out the method as claimed in claim 1, comprising a computer-controlled robot (10) for the guiding of an individual gas turbine blade (2), at least one grinding machine (70, 70') in the radius of action (12) of the robot (10) for the metal-removing machining of this gas turbine blade (2), and also a computer unit (20) for controlling the robot (10), which comprises a data memory (21) in which the movement sequence of the robot (10) is stored, wherein the stored movement sequence is designed for converting a blade from a predetermined statistical average wear state into an also predetermined or precalculated design contour; and in that the at least one grinding machine (70, 70') has a sensor for the contact pressure of the workpiece and its measured signal output is connected to the computer unit (20).

9. The arrangement as claimed in claim 8, wherein provision is made on the robot (10) for a gripper arm (11) with which the automatic gripping of gas turbine blades (2) by their roots is possible; wherein the gripper arm (11) is exchangeably designed and provision is made for a magazine (40) for different gripper arms (41, 42, 43), from which the robot (10) can be automatically operated.

10. The arrangement as claimed in claim 8, wherein the movement axes of the robot (10) are oriented so that the non-cutting time elements during movements perpendicularly to the grinding disk (71, 71') are as small as possible.

11. The arrangement as claimed in claim 8, wherein provision is made for a sensor (50) for measuring the length of a gas turbine blade (2).

12. The arrangement as claimed in claim 8, wherein the grinding machine for the metal-removing machining of a workpiece which is applied with contact force at the working point comprises a rotating grinding disk (71) which is driven by means of a motor (72); in that the grinding disk is displaceably mounted in the contact pressure direction on a path; and in that provision is made for a device (75, 76) for creating a defined contact pressure (78).

13. The arrangement as claimed in claim 12, wherein the path (74) on which the grinding disk (71) is displaceable lies in the plane of the grinding disk and is rectilinear or circular.

14. The arrangement as claimed in claim 13, wherein provision is made for a pendulum suspension (73) for the grinding disk (71).

15. The arrangement as claimed in claim 12, wherein the path (74) on which the grinding disk (71) is displaceable is designed so that in the event of failure of the drive unit (75) for creating or controlling the contact pressure the grinding disk (71) is automatically moved away from the workpiece.

16. The method as claimed in claim 2, wherein the robot (10) can exchange the gripper arms (11, 41, 42, 43) automatically.

17. The method as claimed in claim 3, wherein the robot (10) can exchange the grinding disks (71, 71') of the at least one grinding machine (70, 70') automatically.

18. The arrangement as claimed in claim 9, wherein provision is made for a robot tool (81) by means of which an automatic exchange of the grinding disks (71, 71') on the grinding machine (70, 70') is possible.

19. The arrangement as claimed in claim 14, wherein provision is made for a pendulum suspension (73) for the motor (72).

20. The arrangement as claimed claim 15, wherein in the event of failure of the drive unit (75) for creating or controlling the contact pressure the grinding disk (71) is automatically moved away from the workpiece on account of gravity.

\* \* \* \* \*